Dec. 29, 1942.  J. HUBBARD  2,306,444
DRAIN OPENER
Filed Oct. 7, 1941  2 Sheets-Sheet 1

Inventor
John Hubbard

By Clarence A. O'Brien
Attorney

Dec. 29, 1942.   J. HUBBARD   2,306,444
DRAIN OPENER
Filed Oct. 7, 1941   2 Sheets-Sheet 2
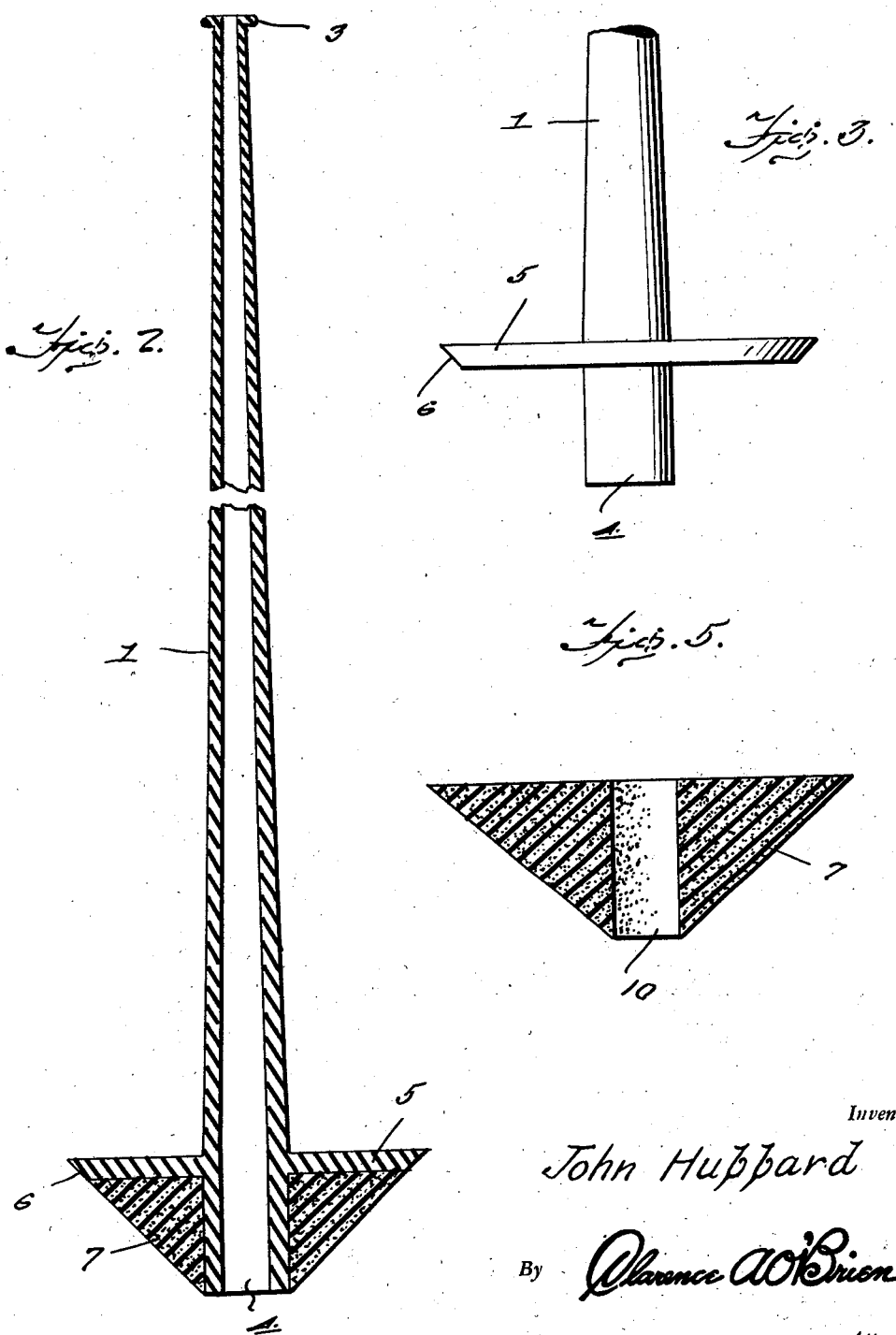
Inventor
John Hubbard
By Clarence A. O'Brien
Attorney Patented Dec. 29, 1942

2,306,444

UNITED STATES PATENT OFFICE 2,306,444

DRAIN OPENER

John Hubbard, San Antonio, Tex.

Application October 7, 1941, Serial No. 414,030

1 Claim. (Cl. 4—257)

The present invention relates to new and useful improvements in drain cleaners particularly for toilets and has for its primary object to provide, in a manner as hereinafter set forth, novel means whereby water under pressure from a conventional faucet may be conveniently used for expeditiously opening clogged drains.

Another very important object of the invention is to provide a drain opener or cleaner of the aforementioned character embodying unique sealing means engageable in the drain to be opened.

Other objects of the invention are to provide a drain opener of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of an opener constructed in accordance with the present invention, showing the device in use in a toilet bowl, said bowl being shown in vertical section.

Figure 2 is a view in vertical section through the device.

Figure 3 is an elevational view of one end portion of the device with the sealing member omitted.

Figure 4 is a plan view of the sponge rubber sealing gasket.

Figure 5 is a view in vertical section, taken substantially on the line 5—5 of Figure 4.

Referring now to the drawings in detail, it will be seen that the embodiment of the invention which has been illustrated comprises a flexible tapered conduit 1 of rubber or other suitable material. The small end of the conduit 1 is adapted to be slipped on a conventional faucet or spigot, as at 2 (see Figure 1). This end of the conduit 1 is provided with a reinforcing bead 3.

The conduit 1 further includes a large end portion 4 of substantially uniform diameter throughout. At the point where the end portion 4 merges with the conduit 1, an integral flange 5 is provided. The flange 5 comprises a beveled periphery 6.

Removably mounted on the end portion 4 of the conduit 1 is a substantially conical sealing gasket or the like 7. The sealing gasket 7 is preferably of sponge rubber and said gasket abuts the flange 4.

It is thought that the manner in which the device is used will be readily apparent from a consideration of the foregoing. Briefly, the small end portion of the conduit 1 is connected to a spigot or faucet and the other end portion of the device is inserted in the intake end portion of the drain 8 of a conventional toilet bowl 9. The substantially conical sponge rubber gasket 7 seals the connection against leakage even under considerable pressure. The water is now turned on and flows under pressure through the conduit 1 and the drain 8 in a manner to quickly open and thoroughly clean the latter. Of course, the conduit 1 may be of any suitable length and diameter. When desired, the conical sponge rubber sealing gasket 7 may be conveniently removed for replacement. It will be observed that the sealing gasket 7 has formed therein a bore 10 which receives the end portion 4 of the conduit 1.

It is believed that the many advantages of a drain opener constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A drain opener of the character described comprising a flexible, tapered conduit connectible, at one end, with a source of water under pressure, an integral, circular, resilient flange on said conduit in spaced relation to the other end thereof, and a substantially conical sponge rubber sealing gasket removably mounted on said other end of the conduit in abutting engagement with said flange, the periphery of said flange being beveled and extending in the plane of the periphery of the gasket.

JOHN HUBBARD.